United States Patent
Kosaka

(10) Patent No.: US 12,442,335 B2
(45) Date of Patent: Oct. 14, 2025

(54) ENGINE CONTROL DEVICE

(71) Applicant: TOYOTA JIDOSHA KABUSHIKI KAISHA, Toyota (JP)

(72) Inventor: Hiroaki Kosaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/945,553

(22) Filed: Nov. 13, 2024

(65) Prior Publication Data

US 2025/0250944 A1    Aug. 7, 2025

(30) Foreign Application Priority Data

Feb. 5, 2024  (JP) ................. 2024-015627

(51) Int. Cl.
*F02D 13/02*  (2006.01)
*F01L 1/344*  (2006.01)

(52) U.S. Cl.
CPC ..... *F02D 13/0261* (2013.01); *F02D 13/0219* (2013.01); *F01L 1/3442* (2013.01)

(58) Field of Classification Search
CPC . F01L 1/3442; F02D 13/0219; F02D 13/0261
USPC ...................................................... 123/90.17
See application file for complete search history.

(56) References Cited

U.S. PATENT DOCUMENTS

| | | | | |
|---|---|---|---|---|
| 4,114,643 A * | 9/1978 | Aoyama | ............ | F01L 13/0031 |
| | | | | 123/90.15 |
| 4,771,742 A * | 9/1988 | Nelson | ............... | F01L 1/34413 |
| | | | | 123/90.15 |
| 4,996,966 A * | 3/1991 | Hitomi | ................. | F02D 23/005 |
| | | | | 123/559.3 |
| 5,090,391 A * | 2/1992 | Sasaki | ................ | F02D 41/0007 |
| | | | | 123/559.3 |
| 5,494,008 A * | 2/1996 | Ohkawa | ............. | F02D 13/0215 |
| | | | | 123/90.15 |
| 5,678,515 A * | 10/1997 | Kato | .................. | F01L 1/34406 |
| | | | | 123/90.15 |
| 5,738,053 A * | 4/1998 | Kato | .................. | F02D 13/0261 |
| | | | | 123/90.15 |
| 6,425,357 B2 * | 7/2002 | Shimizu | ............. | F01L 13/0021 |
| | | | | 123/90.2 |
| 2002/0100445 A1 * | 8/2002 | Takenaka | ................. | F01L 1/34 |
| | | | | 123/90.15 |
| 2002/0108592 A1 * | 8/2002 | Takemura | ................ | F01L 1/34 |
| | | | | 123/90.15 |
| 2005/0092272 A1 * | 5/2005 | Shindou | ................. | F01L 1/344 |
| | | | | 123/90.16 |

(Continued)

FOREIGN PATENT DOCUMENTS

| | | | | |
|---|---|---|---|---|
| GB | 2274878 A | * | 8/1994 | ......... F02D 13/0219 |
| JP | 2005180285 A | * | 7/2005 | ......... F02D 13/0238 |

(Continued)

*Primary Examiner* — Jorge L Leon, Jr.

(74) *Attorney, Agent, or Firm* — SoraIP, Inc.

(57) ABSTRACT

The control device is applied to an engine that uses hydrogen as a fuel. The control device includes a processing circuit that adjusts the valve overlap amount by controlling the valve timing of at least one of the intake valve and the exhaust valve. The processing circuit increases the amount of valve overlap when the engine is operated in the high-load, high-rotation range as compared to the case where it is not.

4 Claims, 4 Drawing Sheets

(56) References Cited

U.S. PATENT DOCUMENTS

2009/0031973 A1* 2/2009 Murata .................. F02M 26/01
                                                              464/1
2013/0206104 A1* 8/2013 Kuhlmeyer ............... F02D 9/08
                                                              123/348

FOREIGN PATENT DOCUMENTS

| JP | 2007-182855 A | | 7/2007 | |
| KR | 20090065291 A | * | 6/2009 | ......... F02D 41/1446 |
| KR | 20170069082 A | * | 6/2017 | ............. F02D 19/08 |

* cited by examiner

ENGINE CONTROL DEVICE

CROSS-REFERENCE TO RELATED APPLICATION

This application claims priority to Japanese Patent Application No. 2024-015627 filed on Feb. 5, 2024, incorporated herein by reference in its entirety.

BACKGROUND

1. Technical Field

The disclosure relates to an engine control device applied to a hydrogen engine that uses hydrogen as a fuel.

2. Description of Related Art

Japanese Unexamined Patent Application Publication No. 2007-182855 (JP 2007-182855 A) discloses a control device applied to a hydrogen engine that uses hydrogen as a fuel.

SUMMARY

Hydrogen is more highly ignitable in comparison with gasoline. Accordingly, when a hydrogen engine is operated in a high load and high revolution range in which temperature in a cylinder becomes high, pre-ignition is more likely to occur as compared with when an engine using gasoline as fuel is operated in a high load and high revolution range.

An engine control device for solving the above problem is applied to an engine that uses hydrogen as a fuel.

The engine control device includes a processing circuit for adjusting a valve overlap amount by controlling a valve timing of at least one valve of an intake valve and an exhaust valve.

The processing circuit increases the valve overlap amount when the engine is operated in a high load and high rotation range, as compared to otherwise.

The above-described engine control device has an advantageous effect of suppressing occurrence of pre-ignition when the engine is operated in a high load and high revolution range.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an engine control device will be described with reference to FIG. 1 to FIG. 6.

Figure 1:
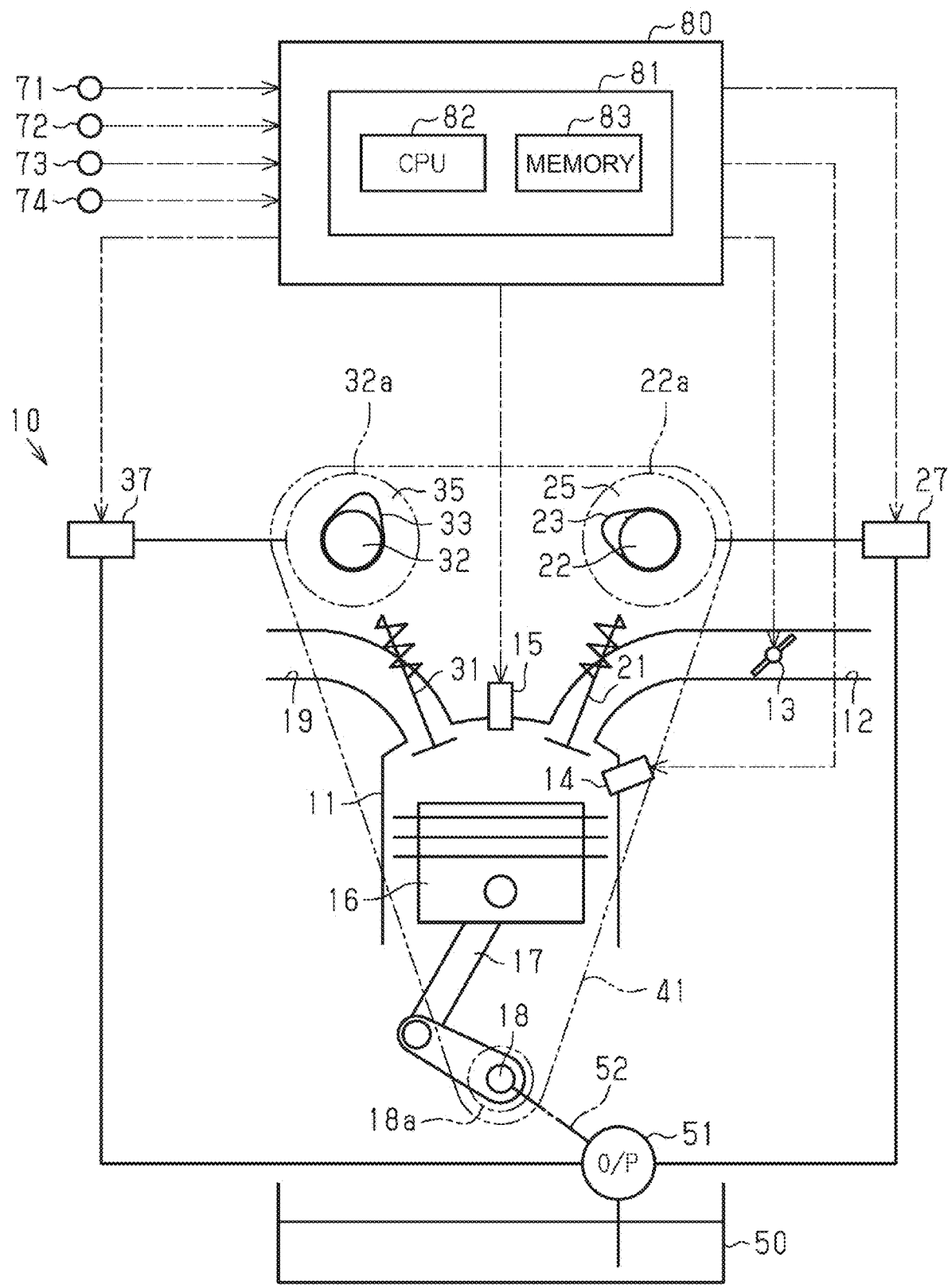
FIG. 1 is a schematic configuration diagram illustrating a control device that is an embodiment of an engine control device and an engine to which the control device is applied.

FIG. 1 illustrates a hydrogen-fueled engine 10 and a control device 80 applied to the engine 10. The control device 80 corresponds to an "engine control device".

Engine

The engine 10 includes a plurality of cylinders 11, an intake passage 12, a plurality of fuel injection valves 14, a plurality of ignition devices 15, a crankshaft 18, and an exhaust passage 19.

The intake passage 12 is a passage through which air to be introduced into the plurality of cylinders 11 flows. A throttle valve 13 is installed in the intake passage 12. By adjusting the throttle opening degree, which is the opening degree of the throttle valve 13, the intake air amount, which is the amount of air flowing through the intake passage 12, is adjusted.

The plurality of fuel injection valves 14 inject hydrogen as fuel. The fuel injection valve 14 may be a port injection valve that injects hydrogen into an intake port of the intake passage 12, or may be an in-cylinder injection valve that injects fuel into the cylinder 11. In the plurality of cylinders 11, an air-fuel mixture containing air and hydrogen is burned by the discharge of the ignition device 15. The power obtained by the combustion of the air-fuel mixture is transmitted to the crankshaft 18 via the piston 16 and the connecting rod 17. As a result, the crankshaft 18 rotates. In the plurality of cylinders 11, exhaust gas is generated by combustion of the air-fuel mixture. Such exhaust gas is discharged from the inside of the plurality of cylinders 11 to the exhaust passage 19.

The engine 10 includes a plurality of intake valves 21 and a plurality of exhaust valves 31. When the intake valve 21 is opened, air is introduced from the intake passage 12 into the cylinder 11 corresponding to the open intake valve 21. When the exhaust valve 31 is opened, the exhaust gas is discharged from the inside of the cylinder 11 corresponding to the open exhaust valve 31 to the exhaust passage 19.

The engine 10 includes an intake camshaft 22 that is a camshaft for the intake valve 21 and an exhaust camshaft 32 that is a camshaft for the exhaust valve 31. The intake camshaft 22 is provided with an intake cam 23 that pushes down and opens the intake valve 21. The exhaust camshaft 32 is provided with an exhaust cam 33 that pushes down and opens the exhaust valve 31.

The intake camshaft 22 and the exhaust camshaft 32 rotate in accordance with the rotation of the crankshaft 18. Specifically, a sprocket 18a is attached to the crankshaft 18. A sprocket 22a is attached to the intake camshaft 22. A sprocket 32a is attached to the exhaust camshaft 32. A timing chain 41 is wound around the plurality of sprocket 18a, 22a, 32a. Therefore, the intake camshaft 22 and the exhaust camshaft 32 are rotated by the rotation of the crankshaft 18.

The engine 10 includes a hydraulically driven valve timing adjustment mechanism and an oil control valve. Hereinafter, the valve timing adjustment mechanism will be referred to as a "VVT mechanism". The oil control valve is referred to as "OCV". The engine 10 includes an intake VVT mechanism 25 and an exhaust VVT mechanism 35 as VVT mechanisms. The intake VVT mechanism 25 adjusts the valve timing of the intake valve 21, that is, the valve opening timing of the intake valve 21. The exhaust VVT mechanism 35 adjusts the valve timing of the exhaust valve 31, that is, the opening timing of the exhaust valve 31. The configurations of VVT mechanisms 25 and 35 will be described later.

The engine 10 includes, as OCV, an intake OCV 27 for an intake VVT mechanism 25, and an exhaust OCV 37 for an exhaust VVT mechanism 35. The intake OCV 27 controls supply and discharge of oil to and from the intake VVT mechanism 25. The exhaust OCV 37 controls supply and discharge of oil to and from the exhaust VVT unit 35.

The engine 10 includes an oil pump 51 that pumps up the oil stored in the oil pan 50 and supplies the oil to each portion of the engine 10. The oil pump 51 is connected to the crankshaft 18 via a timing belt 52. Therefore, the rotation of the crankshaft 18 is transmitted to the oil pump 51, so that the oil pump 51 is operated. The oil supply destination of the oil by the oil pump 51 includes an intake OCV 27 and an exhaust OCV 37.

VVT Mechanism

Figure 2:
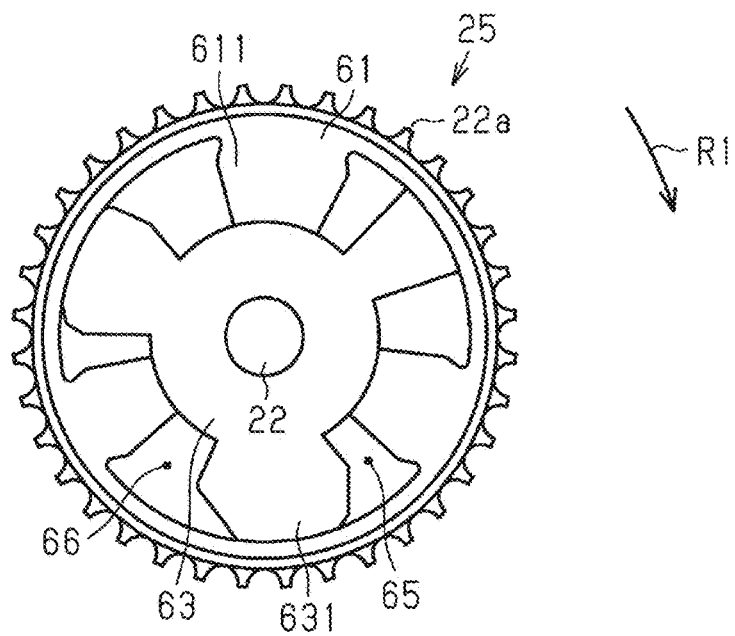
FIG. 2 is a schematic diagram illustrating a valve timing adjustment mechanism included in the engine of FIG. 1.

Referring to FIG. 2, a configuration of the intake VVT mechanism 25 will be described.

The intake VVT mechanism 25 includes a housing 61 and a vane rotor 63 accommodated in the housing 61. The housing 61 is attached to the sprocket 22a. Therefore, the housing 61 rotates in synchronization with the crankshaft 18. At this point, the housing 61 corresponds to the "input rotating body". When the rotation direction of the intake camshaft 22 is referred to as a "rotation direction R1", a plurality of partition walls 611 are provided along the rotation direction R1 on the inner circumference of the housing 61.

The vane rotor 63 is fixed to the intake camshaft 22. Therefore, the vane rotor 63 rotates in synchronization with the intake camshaft 22. At this point, the vane rotor 63 corresponds to the "output rotating body". The vane rotor 63 has vanes 631 located between two partition walls 611 adjacent to each other in a rotation direction R1. In the example shown in FIG. 2, since three partition walls 611 are provided, the vane rotor 63 has three vanes 631.

The vane 631 divides the space between two partition walls 611 adjacent to each other in the rotation direction R1 into two chambers. Of these two chambers, the chamber located in the opposite direction of the rotation direction R1 is the advance chamber 65, while the chamber located in the rotation direction R1 is the retard chamber 66. That is, in the intake VVT mechanism 25, the advance chamber 65 and the retard chamber 66 are formed by the housing 61 and the vane rotor 63.

In the intake VVT mechanism 25, the relative rotational phase, which is the relative rotational phase of the housing 61 and the vane rotor 63, is changed by supplying and discharging the oil in the advance chamber 65 and the retard chamber 66. The supply and discharge of the oil to and from the advance chamber 65 and the retard chamber 66 are performed by an intake OCV 27. For example, when the amount of oil supplied to the advance chamber 65 increases, the hydraulic pressure in the advance chamber 65 increases, so that the vane rotor 63 rotates in the rotation direction R1 relative to the housing 61. As a result, the valve opening timing of the intake valve 21 changes to the advance angle side. When the supply of the oil to the advance chamber 65 and the discharge of the oil from the retard chamber 66 are continued, the vane 631 of the vane rotor 63 comes into contact with the partition wall 611 of the housing 61 and the like, and thus it becomes impossible to further change the valve opening timing of the intake valve 21 to the advance side. At this time, the valve opening timing of the intake valve 21 is the "valve opening timing of the most advanced angle".

On the other hand, when the amount of oil supplied to the retard chamber 66 increases, the hydraulic pressure in the retard chamber 66 increases, so that the vane rotor 63 rotates in the direction opposite to the rotation direction R1 relative to the housing 61. As a result, the valve opening timing of the intake valve 21 changes to the retard side. When the supply of the oil to the retard chamber 66 and the discharge of the oil from the advance chamber 65 are continued, the vane 631 of the vane rotor 63 comes into contact with the partition wall 611 of the housing 61 and the like, and thus it becomes impossible to further change the valve opening timing of the intake valve 21 to the retard side. At this time, the valve opening timing of the intake valve 21 is the "valve opening timing of the most retarded angle".

Here, the configuration and operation of the intake VVT mechanisms 25 have been described. The configuration and operation of the exhaust VVT mechanism 35 are substantially the same as the configuration and operation of the intake VVT mechanism 25. That is, the exhaust VVT mechanism 35 includes a housing 61 as an input rotating body and a vane rotor 63 as an output rotating body. The advance chamber 65 and the retard chamber 66 are formed by the housing 61 and the vane rotor 63. The supply and discharge of the oil in the advance chamber 65 and the retard chamber 66 of the exhaust VVT mechanism 35 are performed by the exhaust OCV 37. By supplying and discharging the oil in the advance chamber 65 and the retard chamber 66, the relative rotational phase, which is the relative rotational phase between the housing 61 and the vane rotor 63, is changed. As a result, the opening timing of the exhaust valve 31 can be adjusted.

Sensors Provided in Engine

As illustrated in FIG. 1, the engine 10 includes a crank angle sensor 71, an intake cam angle sensor 72, an exhaust cam angle sensor 73, and an air flow meter 74 as sensors. Each of the plurality of sensors 71 to 74 outputs a detection signal to the control device 80. The crank angle sensor 71 outputs a detection signal corresponding to the rotational speed of the crankshaft 18. The intake cam angle sensor 72 outputs a detection signal corresponding to the rotation speed of the intake camshaft 22. The exhaust cam angle sensor 73 outputs a detection signal corresponding to the rotation speed of the exhaust camshaft 32. The air flow meter 74 detects an amount of air flowing through the intake passage 12.

The rotational speed corresponding to the detection signal of the crank angle sensor 71 is referred to as "engine rotational speed NE". The rotational speed corresponding to the detection signal of the intake cam angle sensor 72 is referred to as an "intake cam rotational speed NIn". The rotational speed corresponding to the detection signal of the exhaust cam angle sensor 73 is referred to as an "exhaust cam rotational speed NEx". The flow rate of the air corresponding to the detected signal of the air flow meter 74 is referred to as "intake air volume GA".

Control Device

The control device 80 includes a processing circuit 81 that controls the operation of the engine 10. An example of the processing circuit 81 is an electronic control unit. The processing circuit 81 includes a CPU 82 and a memory 83 storing a control program executed by CPU 82. When CPU 82 executes the control program of the memory 83, the processing circuit 81 controls the fuel injection amount of the fuel injection valve 14, the throttle opening degree, the ignition timing by the ignition device 15, the valve opening timing of the intake valve 21, and the valve opening timing of the exhaust valve 31.

Adjusting Valve Overlap Amount

Figure 3:
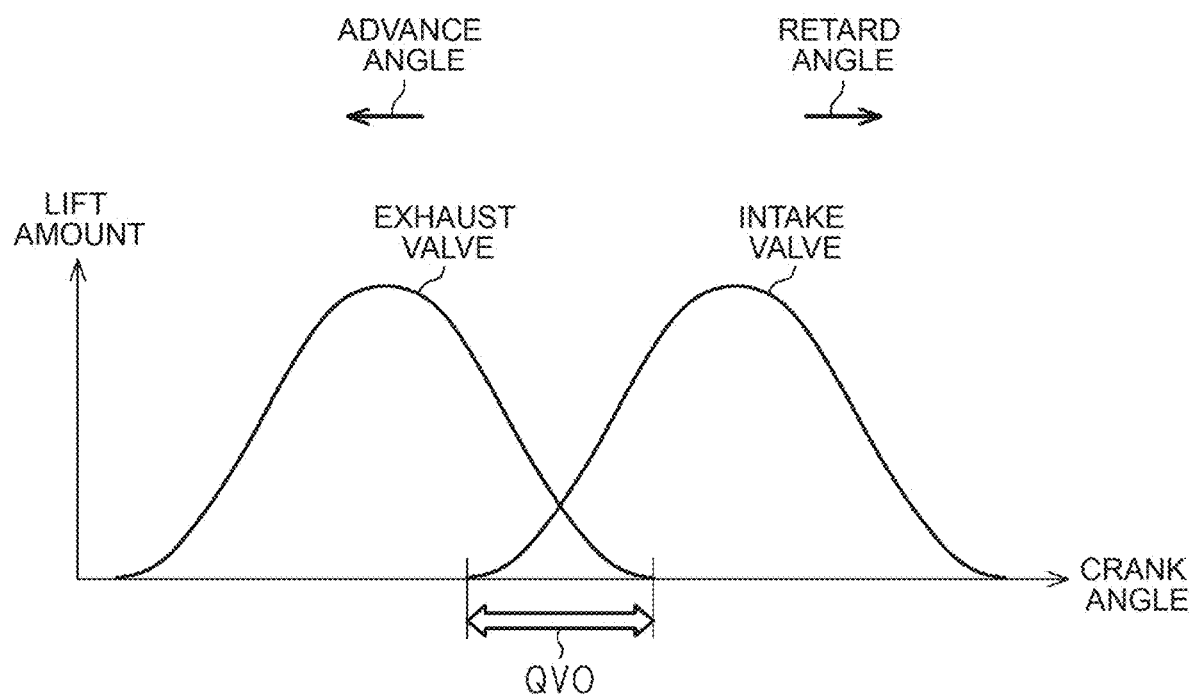
FIG. 3 is a diagram illustrating a state in which a period in which the intake valve is open and a period in which the exhaust valve is open overlap each other.
Figure 4:
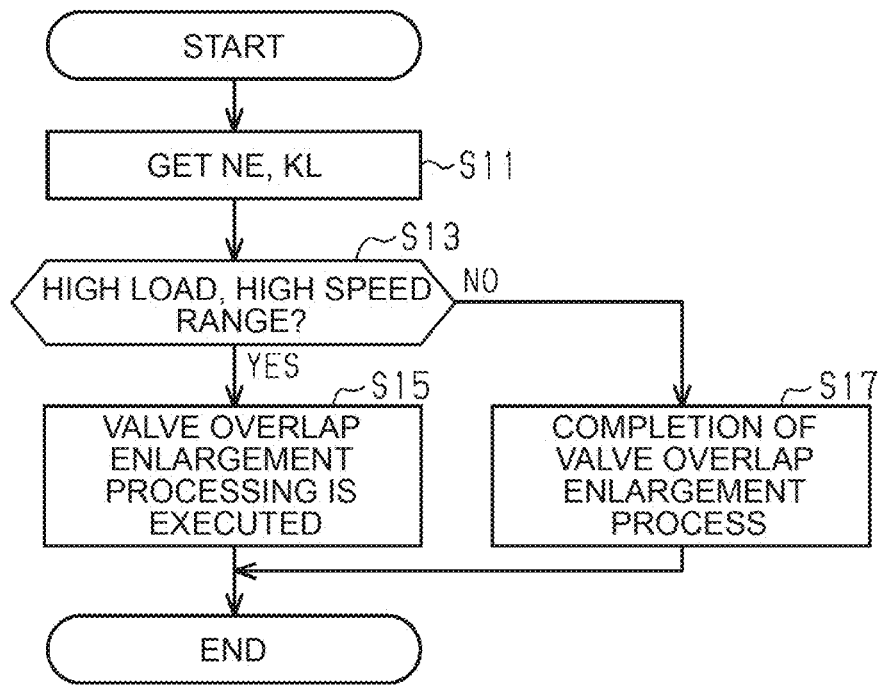
FIG. 4 is a flowchart illustrating a series of processes executed by the control device of FIG. 1.
Figure 5:
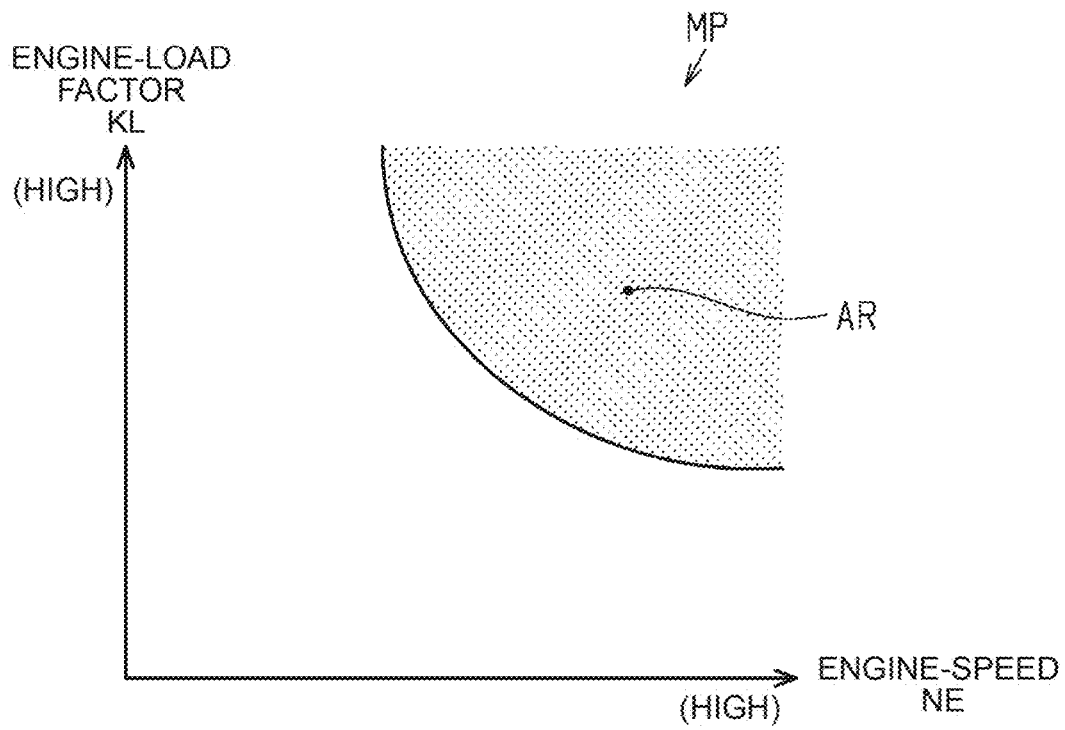
FIG. 5 is a map showing the operating range of the engine.

Referring to FIG. 3, FIG. 4, and FIG. 5, the control of the valve overlap quantity QVO by the processing circuit 81 will be described.

First, referring to FIG. 3, the valve overlap quantity QVO will be described. The valve overlap quantity QVO corresponds to a length of time during which both the intake valve 21 and the exhaust valve 31 are open. When the valve opening timing and the valve closing timing of the intake valve 21 change to the advance angle side or the valve opening timing and the valve closing timing of the exhaust valve 31 change to the retard angle side, the valve overlap quantity QVO increases. When the valve overlap quantity QVO increases, scavenging performance in the cylinder 11 increases.

Referring to FIG. 4, a series of processing performed by the processing circuit 81 to adjust the valve overlap quantity QVO will be described. During the operation of the engine 10, the processing circuit 81 repeatedly executes the series of processes every predetermined control cycle.

In S11, the processing circuit 81 acquires the engine speed NE and the engine load factor KL. The engine load factor KL is a ratio of the current in-cylinder inflow intake air amount to the in-cylinder inflow intake air amount when the engine 10 performs steady operation with the throttle valve 13 fully opened at the current engine speed NE. The cylinder inflow air amount is an amount of air flowing into the plurality of cylinders 11 in the intake stroke.

In the next S13, the processing circuit 81 determines whether the current operating range of the engine 10 is the high-load/high-rotation range AR. For example, the processing circuit 81 refers to the map MP shown in FIG. 5 and determines whether the present operation range is the high-load/high-rotation range AR.

As shown in FIG. 5, the high-load/high-rotation range AR is an operating region in which both the engine load factor KL and the engine speed NE are high. When the point indicated by the current engine load factor KL and the engine speed NE is included in the high-load/high-rotation range AR, the processing circuit 81 determines that the current operating region is the high-load/high-rotation range AR. On the other hand, when the point indicated by the current engine load factor KL and the engine speed NE is not included in the high-load/high-rotation range AR, the processing circuit 81 determines that the current operating region is not the high-load/high-rotation range AR.

Returning to FIG. 4, in S13, when the processing circuit 81 determines that the present operation region is the high-load/high-rotation range AR (S13: YES), the processing proceeds to S15.

In S15, the processing circuit 81 executes the valve overlap enlarging processing. In the valve overlap enlargement processing, the processing circuit 81 increases the valve overlap quantity QVO as compared with the case where the processing is not executed. For example, the processing circuit 81 performs at least one of changing the valve opening timing and the valve closing timing of the intake valve 21 to the advance side, and changing the valve opening timing and the valve closing timing of the exhaust valve 31 to the retard side. Accordingly, the processing circuit 81 increases the valve overlap quantity QVO. As a result, the processing circuit 81 can increase the valve overlap quantity QVO compared to the case where it is determined that the operating range of the engine 10 is the high-load/high-rotation range AR. The term "otherwise" as used herein refers to a case where it is determined that the operating range of the engine 10 is not the high-load/high-rotation range AR.

For example, in the valve overlap enlargement process, the processing circuit 81 performs any one of setting the valve opening timing and the valve closing timing of the intake valve 21 to the timing of the maximum advance angle, and setting the valve opening timing and the valve closing timing of the exhaust valve 31 to the timing of the maximum retard angle. Accordingly, the processing circuit 81 can set the valve overlap quantity QVO to the highest value. After that, the processing circuit 81 temporarily ends the series of processes.

On the other hand, in S13, when it is determined that the present operation region is not the high-load/high-rotation range AR (S13: NO), the processing circuit 81 shifts the processing to S17. In S17, the processing circuit 81 ends the valve overlap enlarging processing. When the valve overlap enlargement processing is executed, the processing circuit 81 can reduce the valve overlap quantity QVO by executing the processing of S17. After that, the processing circuit 81 temporarily ends the series of processes.

When the valve overlap process is not executed, the processing circuit 81 adjusts the valve opening timing of the intake valve 21 and the valve opening timing of the exhaust valve 31 according to the operating state of the engine 10 at that time. In this case, the processing circuit 81 sets the valve opening timing of the intake valve 21 at a time between the time of the most advanced angle and the time of the most retarded angle. Similarly, the processing circuit 81 sets the valve opening timing of the exhaust valve 31 at a time between the time of the most advanced angle and the time of the most retarded angle.

Operation and Effect of Present Embodiment

Figure 6:
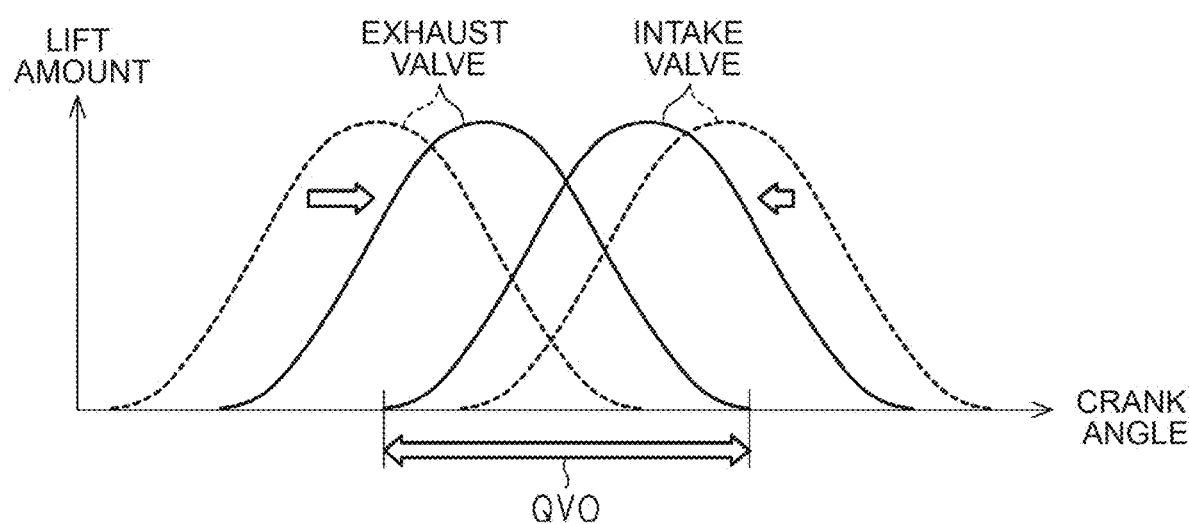
FIG. 6 is a diagram illustrating a state in which the valve overlap amount is increased.

The operation and effects of the present embodiment will be described with reference to FIG. 6.

The processing circuit 81 executes the valve overlap enlargement processing when it is determined that the operating range of the present engine 10 is the high-load/high-rotation range AR. As a result, as shown in FIG. 6, the processing circuit 81 can increase the valve overlap quantity QVO when the engine 10 is operated AR the high-load and high-speed range, as compared with the case where the engine is not operated.

Here, hydrogen has higher ignitability than gasoline. Therefore, in the engine 10, when the temperature in the cylinder 11 increases, there is a high possibility that pre-ignition occurs. When the engine 10 is operated AR the high-load and high-rotation range, the inside of the cylinder 11 is higher than when the engine 10 is operated in the other operation range.

Therefore, the processing circuit 81 increases the valve overlap quantity QVO by executing the valve overlap enlargement processing. The larger the valve overlap quantity QVO, the higher the scavenging performance in the cylinder 11. Therefore, when the engine 10 is operated AR a high-load, high-speed range, it is possible to suppress an increase in the temperature in the cylinder 11. Therefore, the control device 80 can suppress generation of pre-ignition when the engine 10 is operated AR the high-load and high-speed range.

Incidentally, when the valve overlap quantity QVO is enlarged, the scavenging property in the cylinder 11 is increased, but unburned hydrogen is easily discharged from the inside of the cylinder 11 to the exhaust passage 19 together with the exhaust gas. However, even if unburned hydrogen is discharged to the exhaust passage 19, unlike gasoline, the exhaust property is less likely to deteriorate. Therefore, the control device 80 can suppress the occurrence of pre-ignition while suppressing deterioration of the exhaust property.

In the present embodiment, the following effects can be further obtained. (1) The cam torque fluctuates due to combustion of the air-fuel mixture in the cylinder 11. In particular, when the engine 10 is operating AR a high-load and high-speed range, the amplitude of the cam torque increases. Due to the variation of the cam torque, VVT mechanisms 25 and 35 vibrate in the above-described rotational phase. When the above-described oscillation of the relative rotational phase is large, the hydraulic pressure in VVT mechanisms 25 and 35 and OCVs 27 and 37 is greatly changed, so that the loads applied to VVT mechanisms 25 and 35 and OCVs 27 and 37 tend to be large.

Here, an engine including an in-cylinder injection valve that directly injects gasoline into a cylinder as fuel is provided with a high-pressure fuel pump for increasing the pressure of the gasoline. The high pressure fuel pump is driven by rotation of one of the exhaust cam and the intake cam. Therefore, by providing the engine with the high-pressure fuel pump, torque fluctuation of the one cam can be suppressed.

However, in the engine 10 using hydrogen as a fuel, since it is not necessary to increase the pressure of hydrogen, the high-pressure fuel pump as described above is not provided in the engine 10. Therefore, when the cam torque greatly fluctuates due to the combustion of the air-fuel mixture in the cylinder 11, VVT mechanisms 25 and 35 greatly vibrate the relatively rotational phase due to the fluctuation of the cam torque.

In this regard, in the valve overlap enlargement process, the control device 80 sets the valve opening timing of the intake valve 21 to the phase of the maximum advance angle. In the intake VVT mechanism 25, oil is continuously supplied to the advance chamber 65. As a result, the vane 631 of the vane rotor 63 is pressed against the partition wall 611 of the housing 61 by the hydraulic pressure in the advance chamber 65. As a result, in the intake VVT mechanism 25, the above-described relatively rotational phase is suppressed from vibrating. Therefore, variations in the oil pressure in the intake VVT mechanisms 25 and the intake OCV 27 are suppressed. Therefore, the control device 80 can reduce the loads applied to the intake VVT mechanisms 25 and the intake OCV 27.

In the valve overlap enlargement process, the control device 80 sets the valve opening timing of the exhaust valve 31 to the phase of the most retarded angle. In this case, the exhaust VVT unit 35 continues to supply oil to the retard chamber 66. As a result, the vane 631 of the vane rotor 63 is pressed against the partition wall 611 of the housing 61 by the hydraulic pressure of the retard chamber 66. As a result, in the exhaust VVT mechanism 35, the above-described relatively rotational phase is suppressed from vibrating. Therefore, variations in the oil pressure in the exhaust VVT mechanism 35 and the exhaust OCV 37 are suppressed. Therefore, the control device 80 can reduce the loads applied to the exhaust VVT mechanism 35 and the exhaust OCV 37.

Modification

The above-described embodiment can be modified as follows. The above-described embodiments and the following modifications can be implemented in combination with each other as long as they are not technically contradictory.

In the valve overlap enlargement processing, the processing circuit 81 may be able to increase the valve overlap quantity QVO by setting the valve opening timing of the intake valve 21 to the timing of the maximum advance angle. In this case, the processing circuit 81 may not set the valve opening timing of the exhaust valve 31 to the most retarded timing.

In the valve overlap enlargement processing, the processing circuit 81 may be able to increase the valve overlap quantity QVO by setting the valve opening timing of the exhaust valve 31 to the most retarded timing. In this case, the processing circuit 81 may not set the valve opening timing of the intake valve 21 to the time of the maximum advance angle.

The processing circuit 81 may be able to increase the valve overlap quantity QVO in the valve overlap enlargement processing. In this case, the processing circuit 81 does not have to perform both setting the valve opening timing of the intake valve 21 to the timing of the maximum advance angle and setting the valve opening timing of the exhaust valve 31 to the timing of the maximum retard angle.

At least one of the intake VVT mechanism and the exhaust VVT mechanism may not be a hydraulically driven VVT mechanism as shown in FIG. 2. For example, at least one of the intake VVT mechanism and the exhaust VVT mechanism may be an electric VVT mechanism.

The control device 80 includes a CPU and a ROM, and is not limited to a device that executes a software-process. That is, the control device 80 may have any of the following configurations (a), (b), and (c).

(a) The control device 80 includes one or more processors that execute various processes in accordance with a computer program. The processor includes CPU and memories such as RAM and ROM. The memory stores a program code or a command configured to cause the CPU to execute the process. Memory, or computer readable media, includes any available media that can be accessed by a general purpose or special purpose computer.

(b) The control device 80 includes one or more dedicated hardware circuits for executing various processes. Dedicated hardware circuits may include, for example, application-specific integrated circuits, i.e., ASIC or FPGA. Note that ASIC is an abbreviation of "Application Specific Integrated Circuit", and FPGA is an abbreviation of "Field Programmable Gate Array".

(c) The control device 80 includes one or more processors that execute a part of various kinds of processing in accordance with a computer program, and one or more hardware circuits dedicated to executing the remaining processing among the various kinds of processing.

It should be noted that the expression "at least one" as used herein means "one or more" of the desired options. As an example, the expression "at least one" as used herein means "only one option" or "both of two options" if the number of options is two. As another example, the expression "at least one" as used herein means "only one option" or "any combination of two or more options" if the number of options is three or more.

What is claimed is:

1. An engine control device for an engine that uses hydrogen as a fuel, the engine control device comprising:
a processing circuit configured to:
acquire an engine speed;
acquire a current amount of air flowing into a plurality of cylinders of the engine;
acquire a maximum amount of the air based on a steady operation of the engine at the acquired engine speed with a fully opened throttle valve;
acquire an engine load factor which corresponds to a ratio of the current amount of air to the maximum amount of air;

determine the engine is operating in a high-load/high-rotation range when (i) the acquired engine speed is greater than or equal to a first threshold value, and (ii) the engine load factor is greater than or equal to a second threshold value that is mapped to the acquired engine speed; and control a valve timing of at least one valve of an intake valve and an exhaust valve so as to increase a valve overlap amount to a predetermined maximum value when the engine is determined to be operating in the high-load/high-rotation range.

2. The engine control device according to claim 1, wherein the valve overlap amount is increased by setting a valve opening timing of the intake valve to a maximum advanced angle, and/or setting a valve opening timing of the exhaust valve to a maximum retarded angle.

3. The engine control device according to claim 1, wherein:

the processing circuit is configured to acquire the engine speed based on a detection signal from a crank angle sensor of the engine.

4. The engine control device according to claim 1, wherein the engine includes:

a crankshaft, a first camshaft configured to actuate the intake valve, a second camshaft configured to actuate the exhaust valve, a hydraulically-driven intake valve timing adjustment mechanism including a first input rotating body configured to rotate in synchronization with the crankshaft, and a first output rotating body configured to rotate in synchronization with the first camshaft, the first input rotating body and the first output rotating body cooperating so as to define an advance chamber of the intake valve timing adjustment mechanism, a first oil pump driven by the crankshaft so as to supply oil to the intake valve timing adjustment mechanism via a first oil control valve, a hydraulically-driven exhaust valve timing adjustment mechanism including a second input rotating body configured to rotate in synchronization with the crankshaft, and a second output rotating body configured to rotate in synchronization with the second camshaft, the second input rotating body and the second output rotating body cooperating so as to define a retard chamber of the exhaust valve timing adjustment mechanism, and a second oil pump driven by the crankshaft so as to supply oil to the exhaust valve timing adjustment mechanism via a second oil control valve, and wherein the valve overlap amount is increased by executing at least one of:

causing the first oil pump to supply the oil to the advance chamber of the intake valve timing adjustment mechanism so as to set a valve opening timing of the intake valve to a maximum advanced angle, and causing the second oil pump to supply the oil to the retard chamber of the exhaust valve timing adjustment mechanism so as to set a valve opening timing of the exhaust valve to a maximum retarded angle.

* * * * *